United States Patent
Hashimura et al.

(10) Patent No.: US 8,669,952 B2
(45) Date of Patent: Mar. 11, 2014

(54) METALLIC NANOPARTICLE PRESSURE SENSOR

(75) Inventors: Akinori Hashimura, Vancouver, WA (US); Liang Tang, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 467 days.

(21) Appl. No.: 13/157,206

(22) Filed: Jun. 9, 2011

(65) Prior Publication Data

US 2012/0313860 A1 Dec. 13, 2012

(51) Int. Cl.
*G06F 3/041* (2006.01)
*B25B 23/14* (2006.01)
*G01L 5/24* (2006.01)

(52) U.S. Cl.
USPC ........................................ 345/173; 73/862.25

(58) Field of Classification Search
USPC ......................................................... 345/173
See application file for complete search history.

(56) References Cited

U.S. PATENT DOCUMENTS

| 7,643,014 | B2 * | 1/2010 | Yang et al. ..................... 345/174 |
| 7,663,607 | B2 | 2/2010 | Hotelling et al. |
| 2007/0070044 | A1 | 3/2007 | Yeh et al. |
| 2009/0034055 | A1 * | 2/2009 | Gibson .......................... 359/296 |
| 2011/0227836 | A1 * | 9/2011 | Li et al. ........................ 345/173 |

FOREIGN PATENT DOCUMENTS

| WO | WO2011062085 | 5/2011 |
| WO | WO2011077981 | 6/2011 |

* cited by examiner

*Primary Examiner* — Charles V Hicks
(74) *Attorney, Agent, or Firm* — Law Office of Gerald Maliszewski; Gerald Maliszewski

(57) ABSTRACT

An electrical pressure sensor is provided with a method for measuring pressure applied to a sensor surface. The method provides an electrical pressure sensor including a sealed chamber with a top surface, first electrode, second electrode, an elastic polymer medium, and metallic nanoparticles distributed in the elastic polymer medium. When the top surface of the sensor is deformed in response to an applied pressure, the elastic polymer medium is compressed. In response to decreasing the metallic nanoparticle-to-metallic nanoparticle mean distance between metallic nanoparticles, the electrical resistance is decreased between the first and second electrodes through the elastic polymer medium.

20 Claims, 5 Drawing Sheets

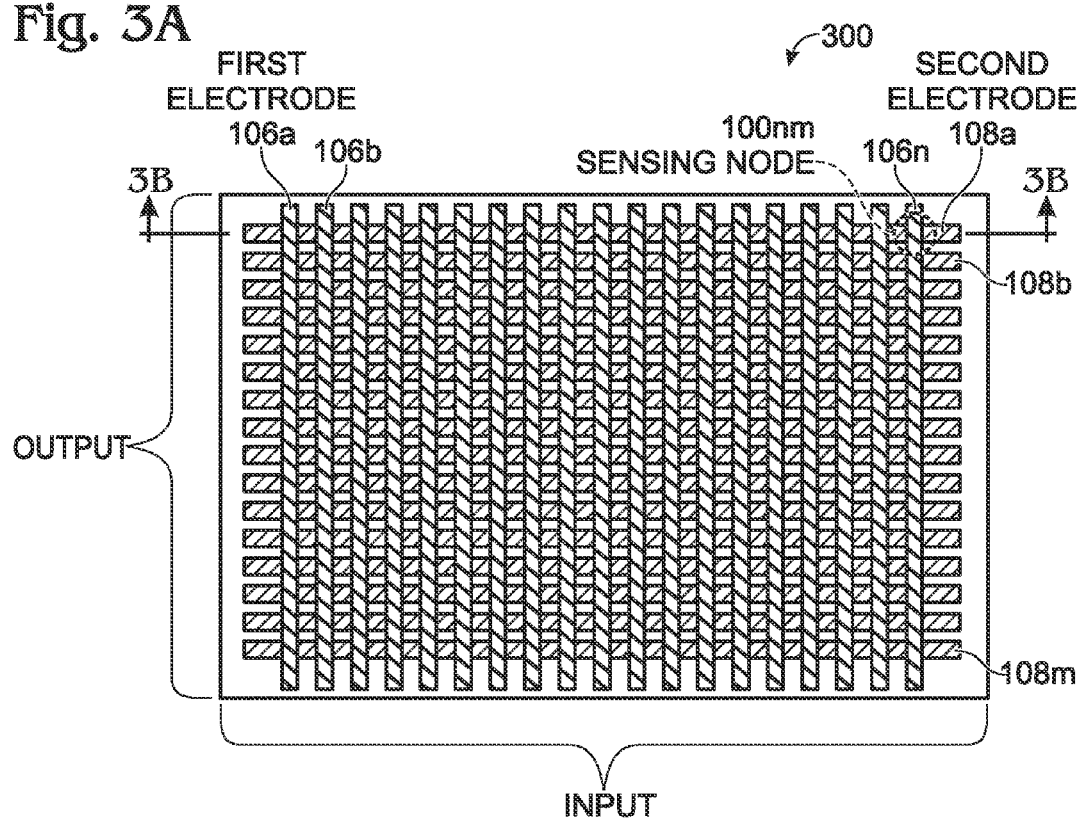
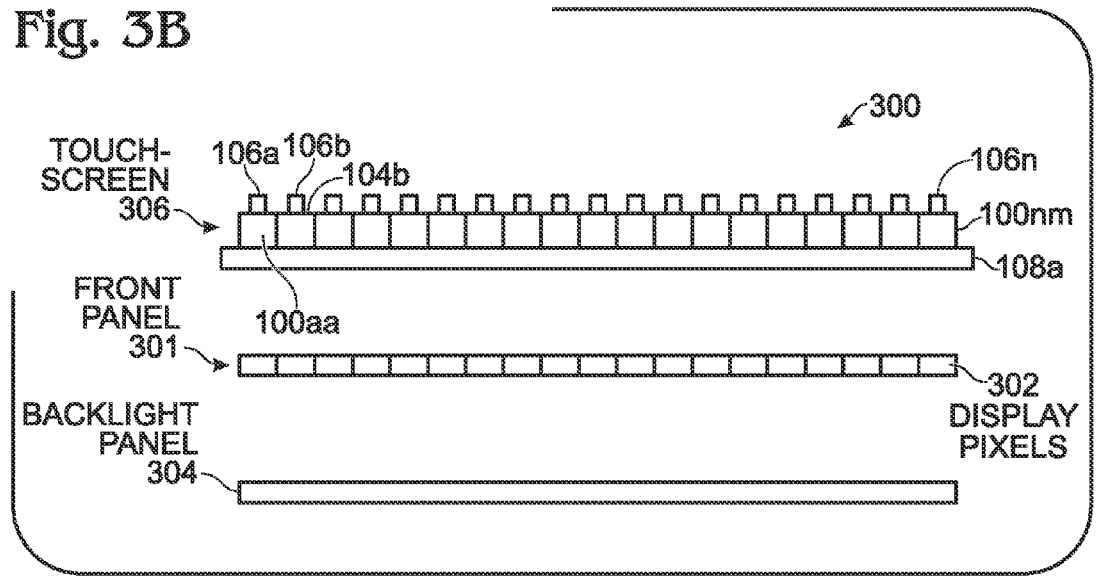

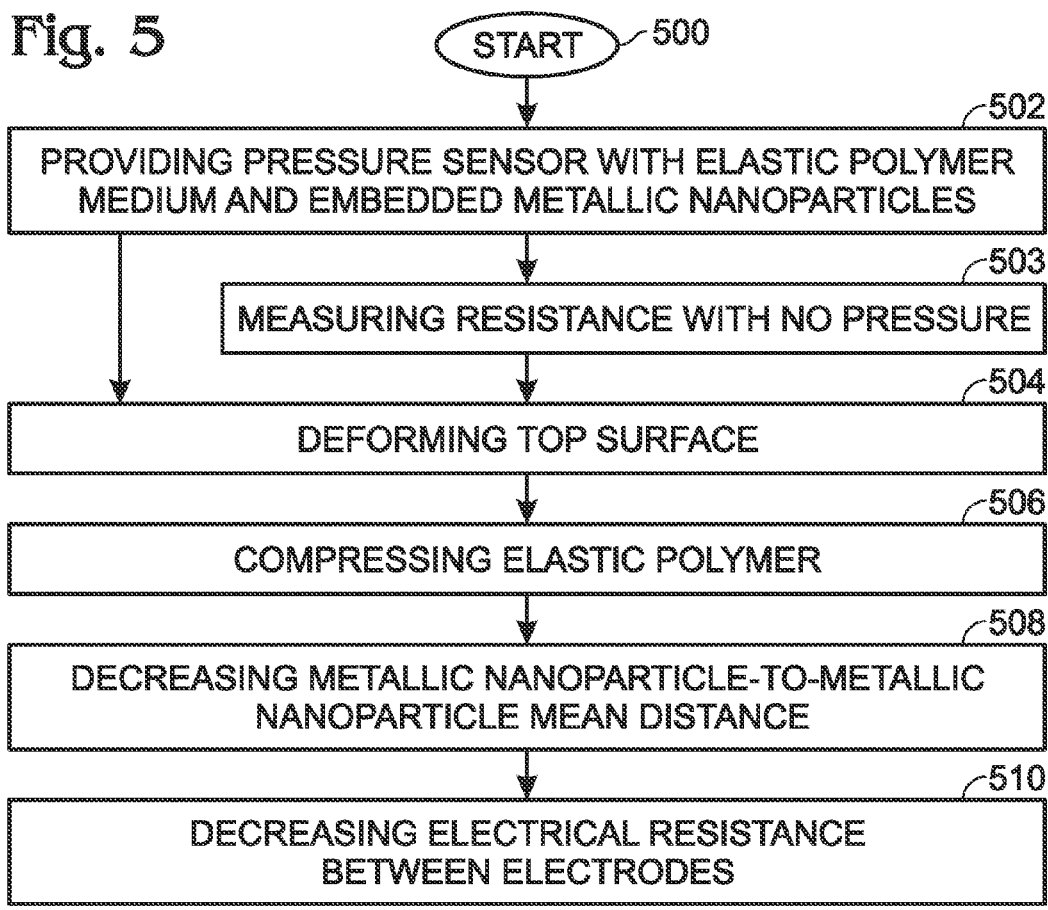
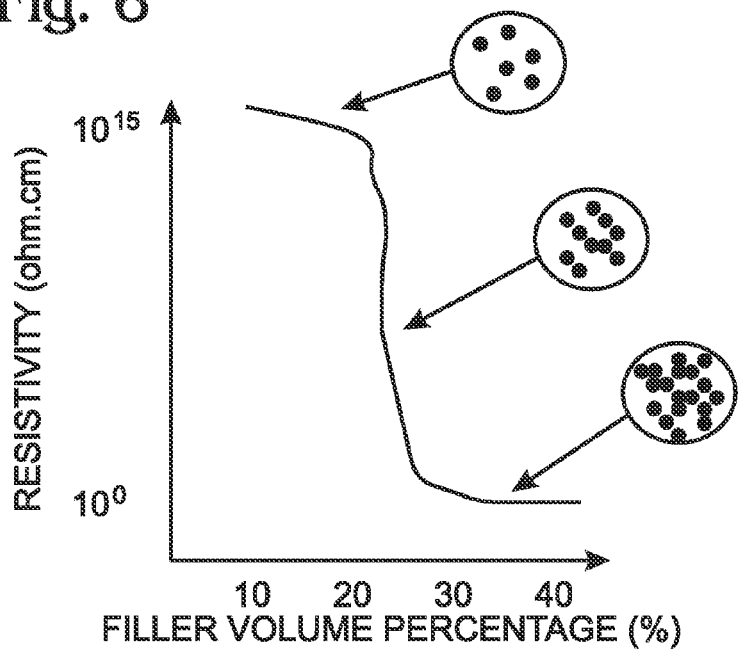

METALLIC NANOPARTICLE PRESSURE SENSOR

BACKGROUND OF THE INVENTION

1. Field of the Invention

This invention generally relates to electronic sensors and, more particularly, to a pressure sensitive sensor fabricated using metallic nanoparticles embedded in an elastic polymer medium.

2. Description of the Related Art

Pressure sensors are one of the most common type sensors used today. A pressure sensor acts as a transducer, generating a signal that is a function of the force imposed, to measure strain due to applied pressure over a certain area. Many types of transducers currently exist including piezoresistive, capacitive, electromagnetic, piezoelectric, and optical types. A pressure sensor can also measure change in density of fluid or gas, to gauge environmental pressures. Some examples include pressure sensors designed to measure a change of resonant frequency using micro electromechanical system (MEMS), the thermal change of heated filament, i.e. pirani gauge, or the flow of charged ionic gas particles in cathode gauge.

Recently, display touchscreen pressure sensors have attracted much attention with the driving demand for smart phones, personal data assistants (PDAs), portable game consoles, and tablet personal computers (PCs). Touchscreen revenues are forecast to increase from $3.7B in 2009 to $9.1B by 2015, which is a much faster growth than the display industry overall. Resistive and capacitive types of touchscreen technology have been used for this purpose, but one problem found in all of these technologies is that they are only capable of reporting a single point even when multiple objects are placed on the sensing surface. Projected capacitive touch (PCT) technology allows for multi-touch operations, but it lacks flexibility in that a conductive layer, such as fingertip, is needed as the pointer object. Also, the long-life operation of PCT is limited by conductive smudges that can occur with collective dust that accumulates on the screen as a result of moisture from fingertips.

Another problem in touchscreen technology is the integration issue of "in-cell" touch panels that are built directly into the screen, instead of the conventional "on-cell" approach which requires an additional piece of glass on top of the screen. The "in-cell" touchscreen is attractive because it has the ability to preserve picture quality and maintain the display's original thickness. However, capacitive type sensors tend to create large electromagnetic interference in liquid crystal due to parasitic effects, and the resistive micro-switch type requires high stroke movement, on the order ~0.5 microns (μm), which can disturb the display operations. Therefore, pressure sensor technologies that can integrate touch panel onto a typical LCD screen with high reliability operations are needed in further advancement of the market.

It would be advantageous if a sensitive pressure sensor could be fabricated that relied upon tunneling current conduction between metallic nanoparticles embedded in an elastic medium to increase sensitivity.

SUMMARY OF THE INVENTION

Disclosed herein is a resistive type pressure sensor, enabled through the flow of tunneling current between metal nanoparticles that are closely spaced apart in liquid or gas environment. When the density of the medium is changed due to an applied external pressure, the metal particles move closer together, forming a conductive path. The resistance between the two conducting electrodes is altered due to increased tunneling current. When the external pressure is released, the particles move away from each other, reducing the tunneling effect, and ultimately increasing the resistance between electrodes.

In one aspect, the pressure sensor has a resistive sensing medium that separates a conductive bottom electrode from a conductive top electrode. Metal nanoparticles are dispersed in the liquid or gas medium that exists between the top and bottom electrodes. In another aspect, there may be multiple conductive bottom electrodes separated from each other. In one aspect, the resistive sensing medium is an elastic polymer doped with metal nanoparticles that are dispersed in the elastic medium.

The pressure sensor can be used in a touchscreen display system. The display system includes an integration of transparent pressure sensors into a display cell panel of liquid crystal or plasma. The display consists of multiple pressure sensors placed in grid format with spatially separated lines or wires. The touchscreen is configured to track multiple objects which may tap or move across the touchscreen at the same time.

Accordingly, a method is provided for measuring pressure applied to a sensor surface. The method provides an electrical pressure sensor including a sealed chamber with a top surface, first electrode, second electrode, an elastic polymer medium, and metallic nanoparticles distributed in the elastic polymer medium. When the top surface of the sensor is deformed in response to an applied pressure, the elastic polymer medium is compressed. In response to decreasing the metallic nanoparticle-to-metallic nanoparticle mean distance between metallic nanoparticles, the electrical resistance is decreased between the first and second electrodes through the elastic polymer medium.

In one aspect, electrical resistance is decreased as a result of electric field assisted tunneling by creating a current as follows:

$$I = K * e * V * \exp\left(-2 * \frac{\sqrt{2*m*\phi}}{h} * d\right)$$

where K=a constant;
V=a bias voltage between the first and second electrodes;
m=electron mass;
e=electron charge;
Φ=work function;
h=reduced Plank's constant; and,
d=particle-to-particle mean distance.

Additional details of the above-described method and a pressure sensor device are provided below.

BRIEF DESCRIPTION OF THE DRAWINGS

FIGS. 3A and 3B are plan and cross-sectional views, respectively, of an electronic display with an overlying touchscreen.

FIG. 5 is a flowchart illustrating a method for measuring pressure applied to a sensor surface.

FIG. 6 is a graph depicting the relationship between filler volume and resistance.

DETAILED DESCRIPTION

Figure 1A:
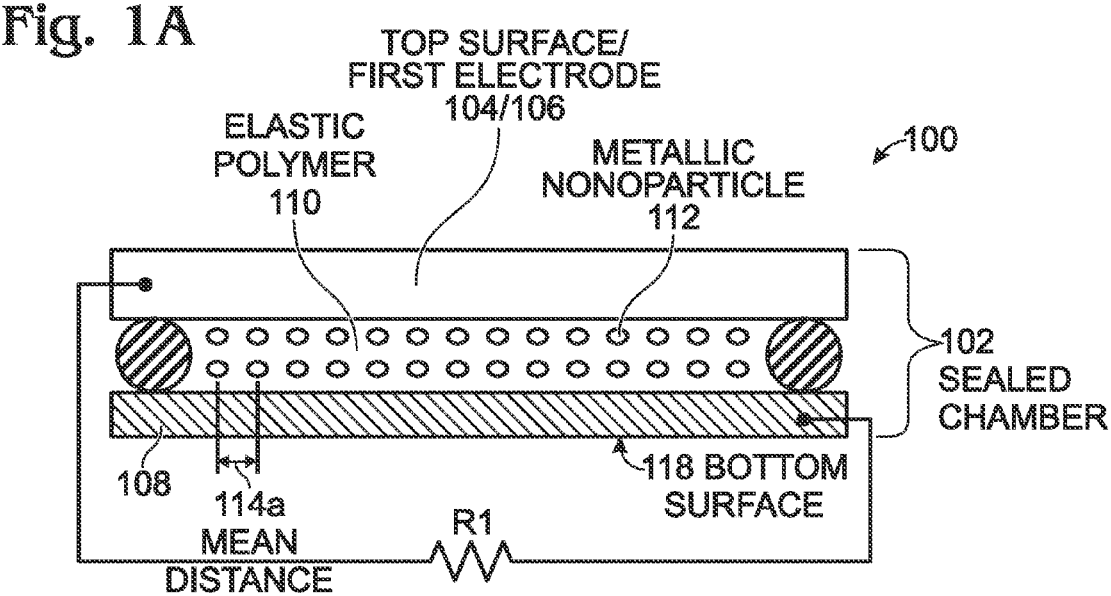
FIGS. 1A and 1B are partial cross-sectional views of a pressure sensor.
Figure 1B:
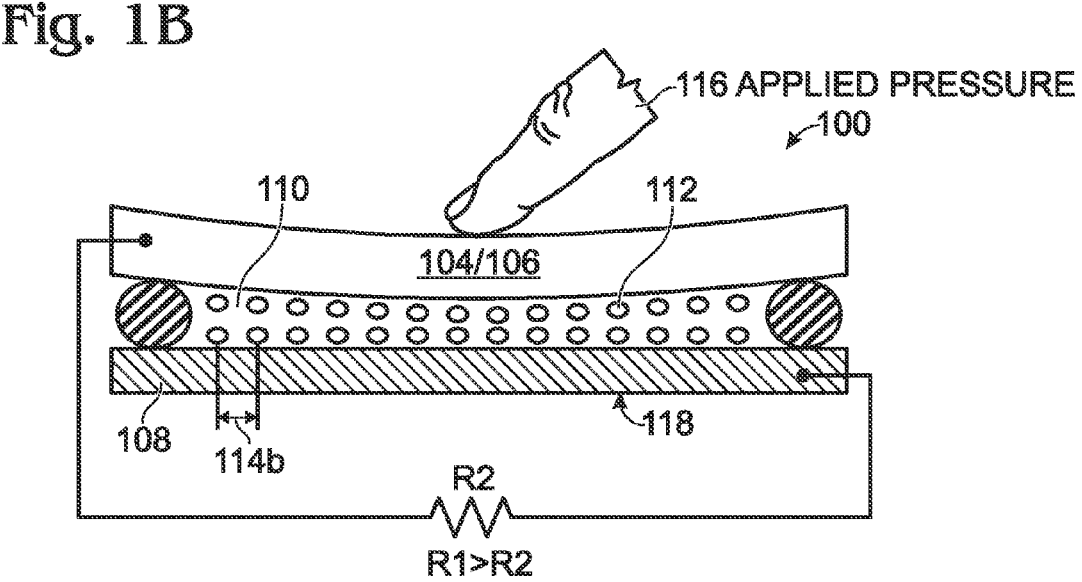

FIGS. 1A and 1B are partial cross-sectional views of a pressure sensor. The pressure sensor 100 comprises a sealed chamber 102 with a top surface 104, a first electrode 106, and a second electrode 108. An elastic polymer medium 110, with distributed metallic nanoparticles 112, at least partially fills the sealed chamber 102. The nanoparticles may be randomly distributed or formed in an array. The elastic polymer medium 110 is in contact with the first electrode 106 and the second electrode 108 when the top surface 104 is deformed by an applied pressure.

Contrasting FIGS. 1A and 1B, the metallic nanoparticles 112 have a metallic nanoparticle-to-metallic nanoparticle mean distance 114 that decreases in responsive to applied pressure 116 on the top surface 104. The result is decreased electrical resistance between the first electrode 106 and the second electrode 108 through the elastic polymer medium 110 (R1>R2). More explicitly, the figures depict that the sealed chamber 102 has a bottom surface 118. The first electrode 104 is formed in the top surface 104, and the second electrode 108 is formed on the bottom surface 118 of the sealed chamber.

Although not explicitly shown, it should be understood that the top electrode may be segmented into a plurality of physically separated electrodes. Likewise, the second electrode may be segmented into a plurality of physically separated electrodes.

Figure 2A:
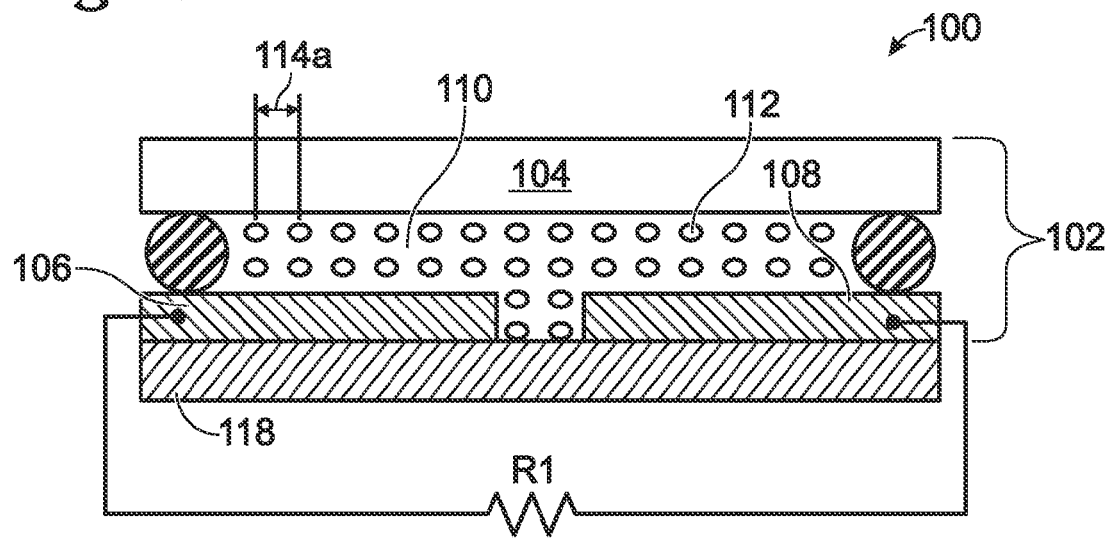
FIGS. 2A and 2B are partial cross-sectional views of a pressure sensor variation.
Figure 2B:
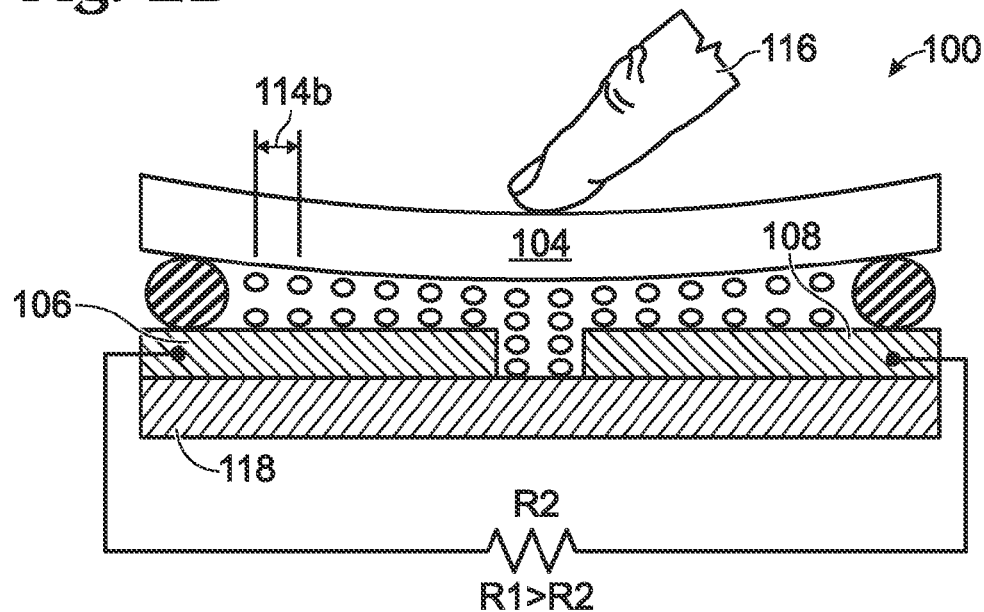

FIGS. 2A and 2B are partial cross-sectional views of a pressure sensor variation. In this aspect, the first electrode 106 is formed on a first portion of the bottom surface 118 of the sealed chamber 102. The second electrode 108 is formed on a second portion of the bottom surface 118 of the sealed chamber. The first electrode 106 is physically separate from the second electrode 108.

Referencing either FIGS. 1A or 1B, the metallic nanoparticles 112 have a metallic nanoparticle-to-metallic nanoparticle first mean distance 114a of greater than 10 nanometers (nm), with no pressure applied to the top surface 104. Contrasting FIG. 1A with FIG. 1B, or FIG. 2A with FIG. 2B, the metallic nanoparticles 112 have a fill volume of less than about 20% in the elastic polymer medium 110, with no pressure applied to the top surface 104, and a fill volume percentage of greater than about 25%, with pressure applied to the top surface 104. In one aspect, the elastic polymer medium 110 is polymer network liquid crystal (PNLC) medium and the metallic nanoparticles 112 are Ag. However other metal and elastic materials can also be used.

Referencing either FIG. 1B or 2B, the metallic nanoparticles 112 conduct electric field assisted tunneling between the first and second electrodes 106/108 when the top surface 104 is deformed by applied pressure 116, as follows:

$$I = K * e * V * \exp\left(-2 * \frac{\sqrt{2*m*\phi}}{h} * d\right)$$

where K=a constant;
V=a bias voltage between the first and second electrodes;
m=electron mass;
e=electron charge;
Φ=work function;
h=reduced Plank's constant; and,
d=particle-to-particle mean distance.

From this equation, it can be estimated that with a work function of ~4 eV (such as with silver nanoparticles), tunneling current reduces by a factor of 10 with respect to a 0.1 nm increase in particle-to-particle distance.

FIGS. 3A and 3B are plan and cross-sectional views, respectively, of an electronic display with an overlying touchscreen. The display 300 comprises a front panel 301 with an array of display pixels 302 arranged in a plurality of adjacent sequences. A backlight panel light source 304 underlies the front panel 301. A touchscreen 306 overlies the front panel 301 with an array of pressure sensor cells 100 arranged in a plurality of adjacent sequences. As described in more detail above, see FIGS. 1A, 1B, 2A, and 2B, each pressure senor cell 100 includes a sealed chamber 102 with a top surface 104, a transparent first electrode 106, and a transparent second electrode 108. Indium tin oxide (ITO) is one example of a transparent conductive electrode. Other transparent conductor material is known in the art. A transparent elastic polymer medium 110, with distributed metallic nanoparticles 112, at least partially fills the sealed chamber 102. The transparent elastic polymer medium 110 is in contact with the first and second electrodes 106/108 when the top surface 104 is deformed by an applied pressure. Liquid crystal (LC) is one example of a transparent elastic polymer medium. Other elastic materials and elastic polymers are known that would enable the pressure sensor. Note: there need not be a one-to-one correspondence between display pixels 302 and pressure sensor cells 100. For example, each pressure sensor cell may be associated with a group of display pixels.

The front panel 301 may use either liquid crystal or plasma display pixels 302. The display 100 includes multiple pressure sensors 100 placed in grid format with spatially separated lines or wires. The touchscreen 306 is configured to track multiple objects which may tap or move across the touchscreen simultaneously. The touchscreen display system does not require high stroke movement of the conductive electrode, thereby preventing the disturbance of display operations.

Functional Description

FIG. 6 is a graph depicting the relationship between filler volume and resistance. Polymer-metal composites consist of two components, a polymer matrix and filler (i.e. metal nanoparticles). The conductivity depends critically on the volume ratio of the filler. For very low filler fractions, the mean distance between conducting particles is large and the conductance is limited by the polymer matrix, which has typically conductivity in the order of $10e^{-15}$ ohm$^{-1}$cm$^{-1}$. When a sufficient amount of filler is loaded, the filler particles get closer and form linkages, which result in an initial conducting path through the whole material. The corresponding filler content at this level is called the percolation threshold. In this concentration range, the conductivity can change drastically by several orders of magnitude for small variations of the filler content. Finally, at high loading of the filler, the increased number of conducting paths forms a three-dimensional network. In this range, the conductivity is high and is less sensitive to small changes in volume fraction.

The process of charge carrier transport can be divided into two steps, the injection of charge carriers into the material (e.g., Fowler-Nordheim or Richardson-Schottky transmission types) and the motion of charge carriers through the material via hopping, tunneling, ballistic transport, diffusion, or metallic conduction. In two-phase composites, four different conduction aspects have to be taken into account: 1) the conduction in the polymer matrix, 2) conduction in the filler material, 3) conduction between adjacent filler particles, and 4) conduction from the filler into the matrix and vice versa. Three different regimes of charge carrier transport are possible:

First, for composites with very low filler ratio well below the percolation threshold, the mean distance between conducting particles is large and no conducting paths throughout the whole composite are established. The mean separation distance between neighboring filler particles is larger than 10 nm, which means that even tunneling from particle to particle cannot take place. In this case, the composite conductivity is the result of transport processes within the polymer host matrix. Therefore, at low fields the loading has little effect on the electrical conductivity of the entire composite.

In the second case, the filler-particles are still well separated, but their mean distance is below a certain threshold particle-to-particle mean distance. In this case, electrical field assisted tunneling can occur between neighboring particles. The following equation gives an expression of the electrical field dependence of the tunneling current.

$$j_{Tunneling} = A \cdot E^n \cdot \exp\left(-\frac{B}{E}\right)$$

The factor exponential (−B/E) characterizes the transition probability of charge carriers from the filler into the polymer, and vice versa. The value B is a measure of the energy barrier between the polymer and the filler material.

Finally, at sufficiently high loading the conducting filler particles are in close contact, touching each other. The conduction of charge carriers occurs through the continuous structure of the chain of filler particles in the polymer matrix. The conductivity is mainly determined by the filler material and its microscopic contacts to adjacent filler particles.

Returning to FIGS. 1A and 1B, the pressure sensors are in an initial state before the external pressure is applied to the top electrode. The resistance between the two bottom electrodes is measured according to the resistance of the liquid or gas medium under which the metal nanoparticles are distributed throughout the environment. Once the external pressure is applied to the top electrode (e.g., with a fingertip), see FIGS. 1B and 2B, the density of the medium changes. The metal particles that were initially dispersed in the medium now move closer together. The movement of the particles generates a tunneling current between closely spaced metal nanoparticles, ultimately creating a conduction path along the bottom electrodes. When the pressure is applied, the resistance drops from initial state by few orders of magnitudes or larger, and as the pressure is released, the resistance returns to near original state. The sensitivity of the pressure sensor is very high compared to conventional resistive type sensor, where direct ohmic contact between the two separate electrodes is necessary. Since the displacement of top electrode can be kept at minimal range, the reliability of the sensor system is largely improved compared to the conventional pressure sensor.

Figure 4A:
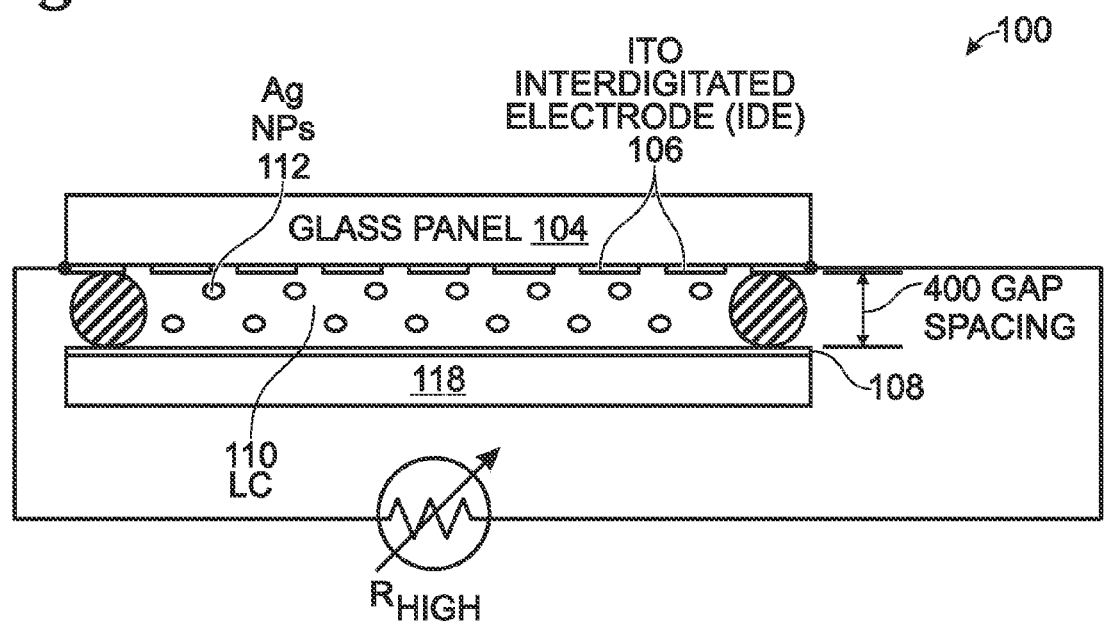
FIGS. 4A and 4B are cross-sectional views of a pressure sensor with multiple first electrodes formed in the top surface of a pressure sensor.
Figure 4B:
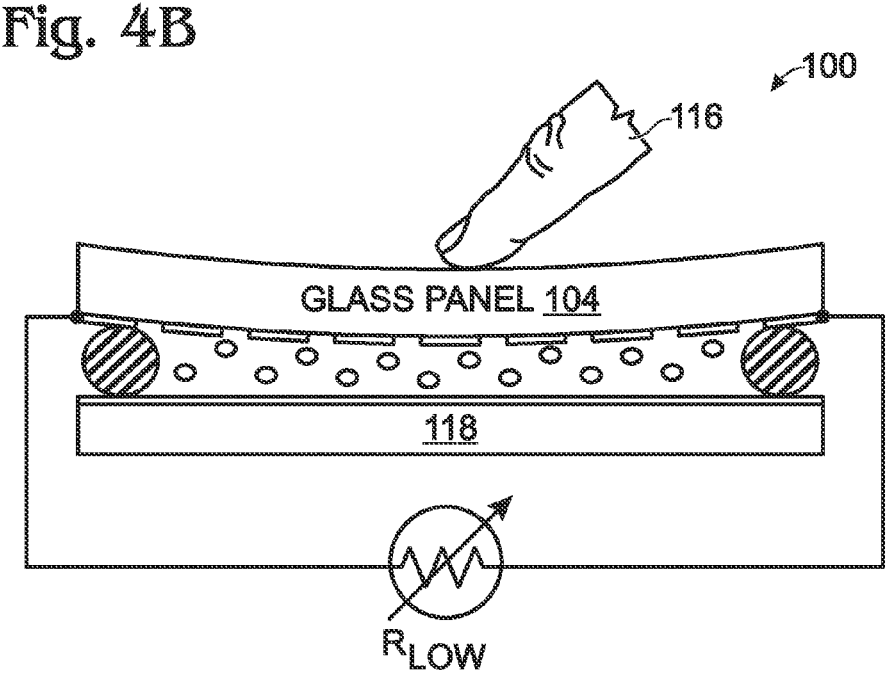

FIGS. 4A and 4B are cross-sectional views of a pressure sensor with multiple first electrodes formed in the top surface of a pressure sensor. In one example, a touchscreen glass panel was assembled using two glass substrates 104 and 118. The top substrate 104 is patterned with ITO interdigitated electrodes 106 (5 μm width and pitch). The bottom substrate 118 is layered with Ag nanoparticles (NPs) of ~100 nm in diameter, not shown. The cell gap spacing 400 is ~4 microns (μm). The liquid crystal (LC) 110 has an elastic constant of $K_{33}$=30 pN as inserted in the cell gap. Ag nanoparticles (NPs) 112 are mixed with LC 110 to generate metal-particle dispersed conductive medium.

Electrical resistance between the IDE top electrodes was measured before and after pressing with a finger 116. After pressuring the glass panel with a finger, a 30 MΩ resistance change was observed between the two electrodes 106/108.

In another example, no Ag NPs were layered on bottom electrode 108 (as shown). The cell gap spacing (V=0.0025 ml) 400 was filled with highly concentrated Ag NPs buffer solution ($3.6E^{+11}$ particles/ml).

The initial two-port resistance was measured to be ~170Ω with no applied pressure, and was likely due to the highly concentration of NPs. After applying pressure with a finger, resistance decreased to 130Ω. With more pressure to the panel, resistance decreased to 100Ω. Release of the finger caused the resistance to revert back to 170-200Ω level. Further optimization of pressure sensitivity is possible by implementing a different elastic medium such as synthetic rubber or an elastic polymer.

FIG. 5 is a flowchart illustrating a method for measuring pressure applied to a sensor surface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 500.

Step 502 provides an electrical pressure sensor including a sealed chamber with a top surface, first electrode, second electrode, an elastic polymer medium, and metallic nanoparticles distributed in the elastic polymer medium. For example, elastic polymer medium may be a polymer network liquid crystal (PNLC) medium and the metallic nanoparticles may be Ag metallic nanoparticles separated by a mean distance of greater than 10 nm (when no pressure is applied to the sensor top surface). Step 504 deforms the top surface in response to an applied pressure. Step 506 compresses the elastic polymer medium. Step 508 decreases the metallic nanoparticle-to-metallic nanoparticle mean distance. In response to decreasing the metallic nanoparticle-to-metallic nanoparticle mean distance, Step 510 decreases electrical resistance between the first and second electrodes through the elastic polymer medium.

In one aspect, Step 502 provides the electrical pressure sensor with the first electrode formed in the top surface and the second electrode formed on a bottom surface of the sealed chamber. Alternatively, the first electrode is formed in a first portion of a bottom surface of the sealed chamber and the second electrode is formed in a second portion of the bottom surface, where the first portion is separated from the second portion.

In another aspect, Step 502 provides a pressure sensor with the metallic nanoparticle-to-metallic nanoparticle first mean distance of greater than 10 nm, with no pressure applied to the top surface. Step 503 measures a first electrical resistance between the first and second electrodes with no pressure applied to the pressure sensor top surface. Deforming the top surface in Step 504 includes deforming the top surface in response to a first applied pressure. Decreasing the metallic nanoparticle-to-metallic nanoparticle mean distance in Step 506 includes decreasing the metallic nanoparticle-to-metallic nanoparticle mean distance to a second mean distance, less than 10 nm. Then, decreasing electrical resistance between the first and second electrodes in Step 508 includes decreasing to a second electrical resistance, less than the first electrical resistance.

In a different aspect, Step 504 deforms the top surface in response to a second applied pressure, greater than the first applied pressure. Step 508 decreases the metallic nanoparticle-to-metallic nanoparticle mean distance to a third mean distance, less than the second mean distance. Then, Step 510 decreases the electrical resistance to a third resistance, less than the second electrical resistance. That is, the third electrical resistance decreases as a result of microscopic contacts between adjacent metallic nanoparticles.

In one aspect, decreasing electrical resistance between the first and second electrodes, to the second electrical resistance (Step 510) includes the second electrical resistance decreasing as a result of electric field assisted tunneling between adjacent metallic nanoparticles. That is, the electric field assisted tunneling creates a current as follows:

$$I = K * e * V * \exp\left(-2*\frac{\sqrt{2*m*\phi}}{h}*d\right)$$

where K=a constant;
V=a bias voltage between the first and second electrodes;
m=electron mass;
e=electron charge;
Φ=work function;
h=reduced Plank's constant; and,
d=particle-to-particle mean distance.

In another aspect, Step 502 provides an electrical pressure sensor with a metallic nanoparticle fill volume of less than about 20% in the elastic polymer medium, and decreasing the metallic nanoparticle-to-metallic nanoparticle to a third mean distance in Step 508 includes creating a fill volume percentage of greater than about 25%.

A pressure sensor and pressure measurement method have been provided. Examples of structures and materials have been presented to illustrate the invention. However, the invention is not limited to merely these examples. Other variations and embodiments of the invention will occur to those skilled in the art.

We claim:

1. A method for measuring pressure applied to a sensor surface, the method comprising:
    providing an electrical pressure sensor including a sealed chamber with a top surface, first electrode, second electrode, an elastic polymer medium, and metallic nanoparticles distributed in the elastic polymer medium;
    deforming the top surface in response to an applied pressure;
    compressing the elastic polymer medium;
    decreasing a metallic nanoparticle-to-metallic nanoparticle mean distance; and,
    in response to decreasing the metallic nanoparticle-to-metallic nanoparticle mean distance, decreasing electrical resistance between the first and second electrodes through the elastic polymer medium.

2. The method of claim 1 wherein providing the electrical pressure sensor includes providing the electrical pressure sensor with the first electrode formed in the top surface and the second electrode formed on a bottom surface of the sealed chamber.

3. The method of claim 1 wherein providing the electrical pressure sensor includes providing the electrical pressure sensor with the first electrode formed in a first portion of a bottom surface of the sealed chamber and the second electrode formed in a second portion of the bottom surface, where the first portion is separated from the second portion.

4. The method of claim 1 wherein providing the electrical pressure sensor includes providing a metallic nanoparticle-to-metallic nanoparticle first mean distance of greater than 10 nanometers (nm), with no pressure applied to the top surface;
    the method further comprising;
    measuring a first electrical resistance between the first and second electrodes with no pressure applied to the pressure sensor top surface;
    wherein deforming the top surface in response to the applied pressure includes deforming the top surface in response to a first applied pressure;
    wherein decreasing the metallic nanoparticle-to-metallic nanoparticle mean distance includes decreasing the metallic nanoparticle-to-metallic nanoparticle mean distance to a second mean distance, less than 10 nm; and,
    wherein decreasing electrical resistance between the first and second electrodes through the elastic polymer medium includes decreasing to a second electrical resistance, less than the first electrical resistance.

5. The method of claim 4 wherein deforming the top surface in response to the applied pressure includes deforming the top surface in response to a second applied pressure, greater than the first applied pressure;
    wherein decreasing the metallic nanoparticle-to-metallic nanoparticle mean distance includes decreasing the metallic nanoparticle-to-metallic nanoparticle mean distance to a third mean distance, less than the second mean distance; and,
    wherein decreasing electrical resistance between the first and second electrodes through the elastic polymer medium includes decreasing to a third electrical resistance, less than the second electrical resistance.

6. The method of claim 5 wherein decreasing electrical resistance between the first and second electrodes to the second electrical resistance includes the second electrical resistance decreasing as a result of electric field assisted tunneling between adjacent metallic nanoparticles.

7. The method of claim 6 wherein decreasing electrical resistance between the first and second electrodes to the third electrical resistance includes the third electrical resistance being a result of microscopic contacts between adjacent metallic nanoparticles.

8. The method of claim 6 decreasing the second electrical resistance as a result of electric field assisted tunneling includes creating a current as follows:

$$I = K * e * V * \exp\left(-2*\frac{\sqrt{2*m*\phi}}{h}*d\right)$$

where K=a constant;
V=a bias voltage between the first and second electrodes;
m=electron mass;
e=electron charge;
Φ=work function;
h=reduced Plank's constant; and,
d=particle-to-particle mean distance.

9. The method of claim 5 wherein providing the electrical pressure sensor with the metallic nanoparticle-to-metallic nanoparticle first mean distance includes providing a metallic nanoparticle fill volume of less than about 20% in the elastic polymer medium.

10. The method of claim 9 wherein decreasing the metallic nanoparticle-to-metallic nanoparticle mean distance to the third mean distance includes creating a fill volume percentage of greater than about 25%.

11. The method of claim 1 wherein providing the electrical pressure sensor including providing a polymer network liquid crystal (PNLC) medium and Ag metallic nanoparticles separated by a mean distance of greater than 10 nm, when no pressure is applied to the pressure sensor top surface.

12. A pressure sensor comprising:
a sealed chamber with a top surface;
a first electrode;
a second electrode;
an elastic polymer medium, with distributed metallic nanoparticles, at least partially filling the sealed chamber and in contact with the first and second electrodes when the top surface is deformed by an applied pressure.

13. The pressure sensor of claim 12 wherein the metallic nanoparticles have a metallic nanoparticle-to-metallic nanoparticle mean distance that decreases in response to applied pressure on the top surface, resulting in decreased electrical resistance between the first and second electrodes through the elastic polymer medium.

14. The pressure sensor of claim 12 wherein the sealed chamber has a bottom surface;
wherein the first electrode is formed in the top surface; and,
wherein the second electrode is formed on the bottom surface of the sealed chamber.

15. The pressure sensor of claim 12 wherein the sealed chamber has a bottom surface;
wherein the first electrode is formed on a first portion of the bottom surface of the sealed chamber; and,
wherein the second electrode is formed on a second portion of the bottom surface of the sealed chamber, and is physically separated from the first electrode.

16. The pressure sensor of claim 12 wherein the metallic nanoparticles have a metallic nanoparticle-to-metallic nanoparticle first mean distance of greater than 10 nanometers (nm), with no pressure applied to the top surface.

17. The pressure senor of claim 12 wherein the metallic nanoparticles have a fill volume of less than about 20% in the elastic polymer medium, with no pressure applied to the top surface, and a fill volume percentage of greater than about 25%, with pressure applied to the top surface.

18. The pressure sensor of claim 12 wherein the elastic polymer medium is polymer network liquid crystal (PNLC) medium and the metallic nanoparticles are Ag.

19. The pressure sensor of claim 12 wherein the metallic nanoparticles conduct an electric field assisted tunneling between the first and second electrodes when the top surface is deformed by applied pressure, as follows:

$$I = K*e*V*\exp\left(-2*\frac{\sqrt{2*m*\phi}}{h}*d\right)$$

where K=a constant;
V=a bias voltage between the first and second electrodes;
m=electron mass;
e 32 electron charge;
Φ=work function;
h=reduced Plank's constant; and,
d=particle-to-particle mean distance.

20. An electronic display with an overlying touchscreen, the display comprising:
a front panel with an array of display pixels arranged in a plurality of adjacent sequences;
a backlight panel light source underlying the front panel;
a touchscreen overlying the front panel with an array of pressure sensor cells arranged in a plurality of adjacent sequences, each pressure senor cell including:
a sealed chamber with a top surface;
a transparent first electrode;
a transparent second electrode;
a transparent elastic polymer medium, with distributed metallic nanoparticles, at least partially filling the sealed chamber and in contact with the first and second electrodes when the top surface is deformed by an applied pressure.

* * * * *

UNITED STATES PATENT AND TRADEMARK OFFICE
CERTIFICATE OF CORRECTION

PATENT NO. : 8,669,952 B2
APPLICATION NO. : 13/157206
DATED : March 11, 2014
INVENTOR(S) : Akinori Hashimura et al.

It is certified that error appears in the above-identified patent and that said Letters Patent is hereby corrected as shown below:

In the Claims

In claim 19, column 10, line 20, the claim has been incorrectly printed to include the line "e 32 electron charge;". The line should be printed as "e = electron charge;" Claim 19 should be printed as follows:

19. The pressure sensor of claim 12 wherein the metallic nanoparticles conduct an electric field assisted tunneling between the first and second electrodes when the top surface is deformed by applied pressure, as follows:

where K = a constant;
V = a bias voltage between the first and second electrodes;
m = electron mass;
e = electron charge;
Φ = work function;
h = reduced Plank's constant; and,
d = particle-to-particle mean distance.

$$nV = nV + (4 - nE)*P(i,j); \text{ and,}$$
$$FV = (nV)\ 2;$$
if nE 8, then
$$nV = nV + (8 - nE)*P(i,j); \text{ and,}$$
$$FV = (nV)\ 3;$$
if nE = 8, then
$$nV = nV - P(i + 1, j + 1) + P(i,j); \text{ and,}$$
$$FV = (nV)\ 4, \text{ then}$$
$$nV = nV + (4 - nE)*P(i,j); \text{ and,}$$

Signed and Sealed this
First Day of July, 2014

Michelle K. Lee
*Deputy Director of the United States Patent and Trademark Office*

CERTIFICATE OF CORRECTION (continued)
U.S. Pat. No. 8,669,952 B2

(cont'd)

$FV = (nV) 2;$
if nE 8, then
$nV = nV + (8 - nE)*P(i,j);$ and,
$FV = (nV) 3;$
if nE = 8, then
$nV = nV - P(i + 1, j + 1) + P(i,j);$ and,
$FV = (nV) 3.$